United States Patent [19]

Kordomenos et al.

[11] Patent Number: 4,491,641
[45] Date of Patent: Jan. 1, 1985

[54] THERMOSETTING COATING COMPOSITION- III

[75] Inventors: Panagiotis I. Kordomenos, Mt. Clemens; Kenneth R. Kurple, Anchorville, both of Mich.

[73] Assignee: Ford Motor Company, Dearborn, Mich.

[21] Appl. No.: 430,182

[22] Filed: Sep. 30, 1982

[51] Int. Cl.$^3$ ............... C08K 11/00; C08G 59/16; C08L 63/10
[52] U.S. Cl. ................... 523/400; 525/514; 528/123; 528/254
[58] Field of Search ............... 525/514; 528/123, 254

[56] References Cited

U.S. PATENT DOCUMENTS 3,215,757 11/1965 Scheibli et al. ............... 525/514
3,951,891 4/1976 Töpfl et al. ............... 525/514
4,296,005 10/1981 Di Benedetto ............... 525/514

OTHER PUBLICATIONS

Lee & Neville, *Handbook of Epoxy Resins*, McGraw-Hill Book Co., New York, N.Y., 1967, pp. 11-13 to 11-15, 11-17 to 11-19 and 17-21.

*Primary Examiner*—John C. Bleutge
*Assistant Examiner*—Robert E. L. Sellers, II
*Attorney, Agent, or Firm*—Peter D. McDermott; Roger L. May

[57] ABSTRACT

A novel epoxy ester resin adapted for use in a thermosetting coating composition is provided, having number average molecular weight ($M_n$) about 1000 to about 5000 and being the reaction product of diepoxide, for example bisphenol-A epichlorohydrin epoxy resin, with (i) diphenol, for example bisphenol-A, in chain extension reaction, (ii) dicarboxylic acid, for example the dimer acid reaction product of the dimerization of C-18 fatty acid, in chain extension reaction, and (iii) fatty acid, for example Soya fatty acid, in chain terminating esterification reaction, which chain extension reactions and esterification reaction occur at least in part substantially simultaneously and at a temperature reaching at least about 137° C. (280° F.). Preferably, catalyst is employed for said chain extension and esterification reactions. Also provided is a novel, solvent based, thermosetting coating composition comprising the novel epoxy ester resin of the invention and polyfunctional aminoplast crosslinking agent. Also provided is a method of making a humidity and solvent resistant coating on a substrate, adapted to provide corrosion protection to the substrate, for example, to bare sheet metal of an automotive vehicle body, which method comprises applying the novel coating composition of the invention to the substrate, for example, by spraying techniques, and subjecting the applied coating to an elevated temperature for a time sufficient to cure the coating.

57 Claims, No Drawings

THERMOSETTING COATING COMPOSITION- III

TECHNICAL FIELD

This invention relates to a novel epoxy ester resin and to a novel, solvent-based, thermosetting coating composition comprising same. It relates also to such coating composition formulated, for example, as sprayable, high solids coating composition suitable for use as an automotive vehicle primer to make coatings which are highly resistant to corrosion, humidity and solvents.

BACKGROUND ART

Solvent-based coating compositions are known which employ high molecular weight (e.g. 5,000 to 40,000) polymer resins having crosslinking functionality, and a suitable crosslinking agent. Typically, such coating compositions are applied to a substrate, for example, by spraying, and are then cured by baking the coated substrate at an elevated temperature suitable to drive off the organic solvent and to promote the crosslinking reaction. The resulting thermoset coating, if sufficiently humidity and solvent resistant, can provide aesthetic and functional advantages including corrosion protection for the underlying substrate.

Coating compositions comprising such high molecular weight polymer resins typically comprise only 25% to 50% solids so as to be sprayable or otherwise conveniently applicable to a substrate. The viscosity of coating compositions of higher solids content is typically too high for this purpose. Conventional epoxy ester based automotive vehicle spray primers, for example, typically have a volatile organic content ("VOC") of approximately 623 g/l (5.2 lb./gal).

Elimination of the volatile organic solvent portion during curing of these conventional low-solids coating compositions is relatively large and therefore presents undersirable material handling difficulties, and added expense. Furthermore, excessive solvent losses and/or solvent recovery equipment add considerable expense to the coating operation. Recently, governmental regulations on hydrocarbon emissions, particularly applicable to automotive coating operations, mandate a significant reduction in volatile organic content for coating compositions. Thus, for example, in the United States, governmental guidelines establish certain deadlines by which time emissions of volatile organics from automotive vehicle primer coating operations must be reduced to within certain defined limits. To meet such guidelines, coating compositions of reduced VOC can be employed in conjunction with emissions treatment equipment to achieve the specified emissions limit. Such treatment presents significant additional expense, however, and thus there is a great need for coating compositions of VOC reduced near to, or preferably even lower than the governmental limits, which yet can be applied to a substrate using known spray application techniques.

In response to these concerns, high solids coating compositions have been suggested which, typically, employ a low molecular weight multi-functional adduct or copolymer in combination with a multi-functional crosslinking agent. These high solids coating compositions can be applied by spraying, for example, with lower VOC than would be possible with conventional epoxy ester based coating compositions or other conventional coating compositions comprising high molecular weight polymer resins. After application to the substrate, high solids coating compositions are cured by baking at a cure temperature, that is, at an elevated temperature suitable to drive off the volatile organic content and to promote crosslinking and in some instances polymerization of the multi-functional low molecular weight component(s).

Typically, the physical properties of the coatings provided by such known high solids coating compositions can differ significantly from those of the cured coatings provided by the conventional, low solids coating compositions. In particular, the cured coatings obtained from known high solids coating compositions can be inferior in that they can be less flexible, less solvent resistant, less adherent to the substrate and/or for other reasons provide less corrosion inhibition for the underlying substrates. Accordingly, it would be highly desirable to provide a coating composition comprising low molecular weight materials suitable for use in high solids, solvent based coating compositions and yet which, upon curing, form coatings having physical properties comparable to those obtained from conventional low solids solvent-based coating compositions.

Accordingly, it is an object of the present invention to provide novel low molecular weight resins suitable for use in high solids, solvent-based thermosetting coating compositions. In this regard, it is a particular object of the invention to provide novel low molecular weight epoxy ester resins which are crosslinkable during cure, on the surface of a substrate.

It is another object of the invention to provide novel coating compositions comprising such crosslinkable epoxy ester resins. In this regard, it is a particular object of the invention to provide a novel epoxy ester thermosetting coating composition of sufficiently low VOC to meet governmental guidelines and yet which can be applied to a substrate by spraying or other known method.

It is another object of the invention to provide a method of making a coating on a substrate, which coating has advantageous physical properties including, for example, humidity and solvent resistance and corrosion protection for the underlying substrate. Additional aspects and advantages of the invention will be apparent from the following description thereof.

DISCLOSURE OF THE INVENTION

According to the present invention, novel low molecular weight crosslinkable epoxy ester resins are provided which are adapted for use in thermosetting coating compositions, and which are especially advantageous for use in high solids, organic solvent based thermosetting coating compositions. The epoxy ester resins of the invention are of number average molecular weight ($M_n$) about 1000 to about 5000, being the reaction product of diepoxide with (i) diphenol in chain extension reaction, (ii) dicarboxylic acid in chain extension reaction, and (iii) fatty acid in chain terminating esterification reaction, which chain extension reactions and esterification reaction occur substantially simultaneously. Preferably, suitable catalyst is employed to promote more simultaneous chain extension and esterification reactions.

According to the coating composition aspect of the invention, a novel, organic solvent based, thermosetting resin composition, in addition to solvent and any pigments and additives such as, for example, catalysts, flow control agents and the like, comprises epoxy ester resin of the invention and polyfunctional aminoplast crosslinking agent such as, for example, hexamethoxymethyl melamine. Particularly preferred compositions of the invention are those formulated as high solids coating compositions adapted to be applied by spraying onto a substrate. Such compositions are especially useful as a primer coat on the bare, unpolished metal surface of an automotive vehicle body. As used herein, a high-solids coating composition is one in which a volatile organic content of about 407 g/l (3.4 lb./gal.) or less yields a viscosity of less than approximately 35 sec., #4 Ford Cup at 27° C. (80° F.).

According to another aspect of the invention, a method of making a corrosion, solvent and humidity resistant coating on a substrate comprises applying to the substrate the novel, solvent based, thermosetting coating composition of the invention and subsequently subjecting the coating to an elevated temperature for a time period sufficient to substantially cure the coating layer. Typically, the novel coating conmpositions of the invention can be cured by heating to between about 100° C. (212° F.) and about 230° C. (445° F.), for a time period sufficient to yield a cured coating, for example for about 15 to about 60 minutes. According to preferred embodiments of the invention, the coating composition can be sufficiently cured for good coating properties by heating to about 120° C. (250° F.) for about 15 minutes but, in addition, such preferred composition will tolerate curing at up to about 200° C. (392° F.) for as much as about 60 minutes without substantial lose of such advantageous coating properties.

The coating compositions of the present invention have been found especially advantageous for use as high solids primer compositions suitable to be applied by spraying techniques. More specifically, high solids coating compositions according to the invention, formulated, for example, at VOC as low as about 347 g/l (2.9 lb./gal.) to about 467 g/l (3.9 lb./gal.) are found to have viscosity as low as about 15 to about 45 sec., #4 Ford Cup at 27° C. and are well suited to spray application techniques. High solids coating compositions according to preferred embodiments are found to have viscosity as low as about 15 sec. to about 25 sec., #4 Ford Cup at 27° C. at VOC of about 407 g/l to about 443 g/l (3.4 to 3.7 lb./gal.). Accordingly, the coating compositions of the invention provide ease of material handling and less expense than previously known coating compositions which were sprayable only at higher VOC. Furthermore, the coating compositions of the invention can be used to meet or exceed governmental guidelines regarding hydrocarbon emissions with a reduction or elimination of emissions treatment and emissions treatment equipment. In addition, reduction in the amount of hydrocarbon solvent used in the coating composition provides direct cost advantage.

Unlike various previously suggested high solids coating compositions, the coating compositions of the present invention provide the above-mentioned low VOC and cure-response advantages without sacrifice of advantageous physical properties in the cured coating. On the contrary, when applied, for example, over a metallic substrate such as when applied as an automotive vehicle primer coat over bare sheet steel, cured coatings according to the invention have been found to provide excellent adhesion to the substrate, excellent humidity resistance, and excellent corrosion resistance in comparison to other commercially available high solids coating compositions of similar nature.

Other features and advantages of this invention will become more apparent from the succeeding, detailed description thereof including the preferred embodiments and best mode of carrying out this invention.

DETAILED DESCRIPTION OF THE INVENTION

It is a significant characterizing aspect of the invention that the chain-extension reactions of the diepoxide with dicarboxylic acid and with diphenol and the chain-termination esterification reaction of the diepoxide with fatty acid are carried out simultaneously. While not wishing to be bound by theory, it is presently understood that the esterification reaction of the carboxyl functionality of the fatty acid with the epoxy functionality of the diepoxide proceeds at approximately the same or similar rate as the chain extension reaction of the phenolic hydroxy functionality of the diphenol with the epoxy functionality and at very nearly the same or similar rate as the chain extension reaction of the carboxyl functionality of the dicarboxylic acid with the epoxy functionality, given the reaction conditions of the invention as specified herein. Likewise, reaction of the hydroxyl functionality (generated by the aforesaid chain extension and chain termination reactions) with the carboxyl functionality of the fatty acid would proceed at very nearly the same or similar rate as the reaction of such hydroxyl functionality with the carboxyl functionality of the dicarboxylic acid.

Carrying out these reactions simultaneously produces a resin comprising a mixture of reaction products of diverse molecular structures, not merely a series of analogs of the same structure. That is, while not wishing to be bound by theory, it is presently understood that in the course of the simultaneous chain extension and chain termination reactions, the epoxide functionality of the diepoxide (and the epoxide functionality of each chain extended intermediate reaction product) reacts with the dicarboxylic acid, diphenol or fatty acid in random sequence. Thus, each chain extended reaction product in the epoxy ester resin of the invention, having followed a certain reaction sequence, would differ from reaction products of different reaction sequence. In addition to reaction products of diverse molecular structures, reaction of the diepoxide (and of the epoxy functional chain extended intermediate reaction products) simultaneously with the dicarboxylic acid and with the diphenol and with the chain terminating fatty acid is seen to yield a product epoxy ester resin of exceptionally wide molecular weight distribution such as, for example, from about 600 or less to about 12,000 or more. A significant advantage of the invention which is presently understood to stem, in part, from the simultaneous reaction, and particularly from such diversity of molecular structure and wide molecular weight distribution of the epoxy ester resin, is the surprisingly low viscosity of the coating compositions comprising these resins. More specifically, the coating compositions of the invention are found to have a significantly lower viscosity at a given solids content (by weight) than many comparable, commercially available high solids coating compositions. Accordingly, the coating composition of the invention can be sprayed or otherwise applied to a substrate at significantly higher solids content and, thus, require significantly lower VOC. Such reduced viscosity and increased solids content provides a highly significant advance in the art for all of the reasons discussed above, including reduced cost of material handling, reduced emissions of volatile organics, reduced cost of compliance with government guidelines, and other related advantages.

It is seen to be another consequence of the exceptionally wide molecular weight distribution and diversity of molecular structure of the epoxy ester resin of the invention that the glass transition temperature (Tg) of the novel epoxy ester resin of the invention is advantageously low. More accurately, it is presently understood that the lower molecular weight fraction of the epoxy ester resin and any unreacted monomer act in the nature of a plasticizer for the resin to effectively provide a lower apparent Tg. In any event, it is significant that the low Tg is achieved, since low Tg is well known to provide an improved, smoother surface on the cured coating since, during heating to cure the coating, after it reaches its Tg and before it substantially cures at its cure temperature, the coating can flow and become smooth. Thus, the lower Tg provides a longer time period during which the coating can flow and become smooth and thus improve the surface quality of the cured coating. In addition, the wide molecular weight distribution of the epoxy ester resin components is believed to contribute, in part, to the advantageous flexibility of the cured coating of the invention. Such high flexibility in conjunction with high aromatic content is especially advantageous in view of the very significant cost advantage of aromatic over aliphatic feedstocks.

Further, it is now believed that aromatics in a coating composition, such as a primer composition for a metal substrate, are more resistant to hydrolysis than are aliphatics. Accordingly, while again not wishing to be bound by theory, it is presently believed that the high aromatic content of the epoxy ester resin of the invention explains in part the exceptional corrosion protection found to be provided by the novel coatings of the present invention. This is especially the case, for example, according to preferred embodiments of the invention further discussed below, wherein the diepoxide reactant as well as the diphenol provides aromatic units to the resin. In addition, it is presently understood that the phenolic oxygens introduced into the epoxy ester resin by the chain extension reaction of phenol with epoxy, advantageously provide excellent adhesion to metal substrate, for example steel substrate. Thus, the high aromatic content of the cured coating and its excellent adhesion each enhances the advantage provided by the other to yield the above-mentioned exceptional corrosion protection of the cured coatings of the invention.

According to a most prefered embodiment of the invention, further discussed below, acyclic aliphatic dicarboxylic acid is employed in the synthesis of the epoxy ester resin. According to this embodiment, the epoxy ester resin reaction product comprises both aromatic and aliphatic moieties in random sequence and distribution. While, again, not wishing to be bound by theory, it is presently understood that the aromatic units of the diphenol and the aliphatic units of the dicarboxylic units each enchance the advantages of the other in an unexpected and synergistic manner. More specifically, the aliphatic units are seen to provide flexibility to the epoxy ester resin while the aromatic units, as mentioned above, provide moisture and corrosion resistance. Thus, the epoxy ester resin reaction product provides a cured coating having both good flexibility and good moisture and corrosion resistance.

The diepoxide reactant suitable for the epoxy ester resin can be any of numerous diepoxides including many which are commercially available and which will be apparent to the skilled of the art in view of the present disclosure. While, ultimately, the choice of reactants for preparing the epoxy-ester resin will depend to an extent upon the particular application intended for the coating composition, terminal diepoxides, that is diepoxides bearing two terminal epoxide groups, are generally most preferred. These are generally more reactive and therefore require reaction conditions under which undesirable side reactions, for example, epoxy-epoxy reactions and gellation, can be more easily avoided. Preferably, the diepoxide has a number average molecular weight ($M_n$) between about 100 and about 1000, and more preferably between about 100 and about 600. Numerous such preferred diepoxides are readily commercially available, for example, bisphenol-A epichlorohydrin epoxy resin, for example, the Epon (trademark) series, Shell Chemical Company, Houston, Tex., and the DER (trademark) series, Dow Chemical Company, Midland, Mich. Also preferred are cycloaliphatic diepoxy resins, for example, the Eponex (trademark) series, Shell Chemical Company, Houston, Tex., hydantoin epoxy resins such as, for example, Resin XB2793 (trademark), Ciba-Geigy Corporation, Ardsley, N.Y., and any of a wide variety of acyclic or cyclic aliphatic diepoxides such as, for example, 1,4-butanediol diglycidyl ether and 4-vinylcyclohexene dioxide and the like. Among those listed, diglycidyl ether bisphenol-A resins or higher molecular weight analogs thereof, are most preferred in view of their cost and commercial availability, for example, Epon 828 (trademark) and Epon 829 (trademark), of the Epon (trademark) series mentioned above. The higher molecular weight members of the Epon (trademark) series are suitable for use where higher molecular weight epoxy ester resins are desired. Generally, however, such higher molecular weight resins provide coating compositions of somewhat higher viscosity (or lower solids content). Additionally, it should be recognized that the higher molecular weight members of the Epon series, for example Epon 1001 and Epon 1004, may be somewhat less preferred, since these bear hydroxyl functionality which may undergo undesirable side reactions with, for example, epoxy functionality. The result can be undersirable resin properties and gellation. Other suitable diepoxides for use in synthesizing the epoxy-ester resin of the invention are commercially available and will be apparent to the skilled of the art in view of the present disclosure. Also, it will be understood from the foregoing that any mixture of compatible diepoxides may be used.

In addition to the diepoxide, a portion of the epoxy functionality can be provided by any compatible monoepoxy compound or, more suitably, polyepoxy compound or mixture of compounds having three or more epoxy groups per molecule. Suitable such polyepoxides include, for example, those of molecular weight about 200 to about 800. The polyepoxide can be essentially any of the well known types such as polygylcidyl ethers of polyphenols. These can be produced by etherification of a polyphenol with epihalohydrin in the presence of alkali. It will be recognized by the skilled of the art in view of the present disclosure, that in some instances, particularly where a coating composition of high solids content is less important, it may be desirable to employ polyepoxides having higher molecular weights. Preferably, any such polyepoxide contains free hydroxyl groups in addition to epoxide groups.

While polyglycidyl ethers of polyphenols can be employed, it is frequently desirable in such compositions to react a portion of the reactive sites (hydroxyl or in some instances epoxy) with a modifying material to vary the film characteristics of the resin. The epoxy resin may be modified, for example, with isocyanate group containing organic materials or other reactive organic materials.

Another quite useful class of polyepoxides are the Novolak resins including, for example, the Novalak epoxy resins ECN 1235 (trademark) and ECN 1273 (trademark), Ciba-Geigy Corporation.

According to preferred embodiments of the present invention, epoxide compounds other than diepoxide compounds provide no more than about 15% and most preferably substantially none of the total epoxide functionality in the reactants used to form the epoxy-ester resin.

The diphenol reactant suitable for the epoxy ester resin of the present invention includes numerous commerically available materials, many of which will be readily apparent to the skilled of the art in view of the present disclosure. Preferred diphenols have the general formula (I):

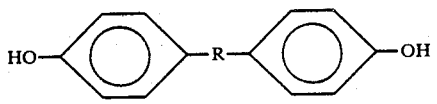

(I)

wherein R is a divalent linking moiety substantially unreactive with the diepoxide resin. Preferably R is a divalent organic linking moiety, for example $(CH_2)_n$ where n is preferably from about 1 to about 8, $C=O$, and the like, although inorganic moieties, for example sulfonyl and the like, are also suitable. Diphenols of this character have been found to provide good reactivity with the preferred diepoxides described above and to provide, ultimately, cured coatings of the invention having excellent physical properties, most notably excellent corrosion protection. It will be apparent to the skilled of the art in view of the present disclosure that R should be substantially unreactive with the fatty acid employed for the epoxy ester resin. Particularly preferred diphenols include those according to formula (I) above, wherein R is selected from the group comprising a straight or branched alkylene or alkylidene moiety of one to about 10 carbons, preferably having three to four carbons and most preferably having the general formula

wherein R' and R" are the same or different and each is a monovalent organic moiety preferably selected from the group comprising hydrogen and lower alkyl, of about one to four carbons, most preferably one or two carbons, and the like or a mixture of any of them. Preferably the diphenol has a number average molecular weight ($M_n$) between about 180 and about 500, more preferably between about 180 and about 250. Diphenols within this range, employed with the preferred diepoxides described above, and suitable fatty acid are found to provide epoxy ester resins comprising mixed reaction products of particularly wide molecular weight distribution, which resins (as discussed above) are found to provide coating compositions of the invention having especially advantageous physical properties including low Tg and good corrosion protection. Such diphenols include, for example bisphenol-A, which is most preferred, bisphenol-B and the like and a compatible mixture of any of them. As used herein the term diphenol may include, for example, compounds comprising a single dihydroxy substituted phenyl ring such as benzenediol. More preferred, however, are those diphenols providing two terminal, mono-hydroxy substituted phenyl rings such as in formula (I), above. Other examples of diphenols are bis-(4-hydroxy-tert-butylphenyl)-2,2-propane, bis-(2-hydroxy-naphthyl)-methane and 1,5-dihydroxynaphthalene. Other suitable diphenols for the epoxy ester resin of the present invention will be apparent to the skilled of the art in view of the present disclosure.

The dicarboxylic acid reactant suitable for the epoxy ester resin of the present invention includes numerous commercially available materials, many of which will be readily apparent to the skilled of the art in view of the present disclosure. Suitable dicarboxylic acids include saturated or unsaturated, cyclic or acyclic aliphatic or aromatic dicarboxylic acids or a mixture thereof. Acyclic aliphatic dicarboxylic acids are generally preferred in view of the enhanced flexibility they provide to the cured coatings of the invention. Preferred dicarboxylic acids have the general formula (I):

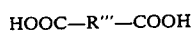 (I)

wherein R''' is a divalent linking moiety substantially unreactive with the diepoxide resin. It will be apparent to the skilled of the art in view of the present disclosure, that R''' should be substantially unreactive also with the fatty acid employed for the epoxy ester resin, with hydroxy functionality (generated in the chain-extension reaction) and, at least at storage temperatures, with the crosslinking agent employed in the coating composition. Preferably R''' is a divalent, organic linking moiety. Particularly preferred are those dicarboxylic acids wherein R''' is selected, from the group comprising a straight or branched alkylene or alkylidene moiety, preferably of about 4–42 carbons, for example, $(CH_2)_n$ where n is prefereably from about 4 to about 42, and the like or a mixture thereof. Dicarboxylic acids of this character have been found to provide good reactivity with the preferred diepoxides described above and to provide, ultimately, cured coatings of the invention having excellent physical properties, most notably excellent flexibility and corrosion protection. Preferably the dicarboxylic acid has a number average molecular weight ($M_n$) between about 145 and about 1000, more preferably about 570. Dicarboxylic acids within this range, employed with the preferred diepoxide and preferred diphenol, described above, and preferred fatty acid, described below, are found to provide epoxy ester resins comprising mixed reaction products of particularly wide molecular weight distribution, which resins (as discussed above) are found to provide coating compositions of the invention having especially advantageous physical properties including low Tg and good humidity and corrosion protection.

Examplary dicarboxylic acids include adipic acid, 3,3-dimethylpentanedioic acid, benzenedicarboxylic acid, phenylenediethanoic acid, naphthalenedicarboxylic acid, pimelic acid, suberic acid, azelaic acid, sebacic acid, and the like or a compatible mixture of any of them. While dicarboxylic acids according to formula (I) can be used, wherein R''' is an alkylene chain of less than 4 carbons, for example, oxalic acid, malonic acid, succinic acid, glutaric acid and the like, these are less preferred in view of the somewhat lesser degree of flexibility provided thereby. Preferably the dicarboxylic acid provides two terminal carboxyl groups. Similarly, preferred aromatic dicarboxylic acids are those wherein the carboxylic groups are more spaced apart, for example, 1,4-benzenedicarboxlyic acid and 2,7-naphthalenedicarboxylic acid.

The most preferred dicarboxylic acids are substantially saturated, acyclic, aliphatic dimer acids, which are well known to the skilled of the art and readily commercially available. These are typically the dimerization reaction products of fatty acids which have from 4 to 22 carbons and a terminal carboxyl group. Of these, the dimer acid of 36 carbons is most prefered since it provides excellent reactivity with the preferred diepoxides described above, provides epoxy ester reaction products of advantageously wide molecular weight distribution, and provides, ultimately, cured coatings of the invention having excellent physical properties. In addition, dimer acid of 36 carbons is readily commercially available, for example, as Empol 1014 (trademark), Empol 1016 (trademark) and Empol 1018 (trademark), each available from Emery Industries, Inc., Cincinnati, Ohio. It should be recognized that most or all commercially available dimer acids contain some portion of trimer acid, typically, for example, about 5–10% but in some case as much as 30% or more, and also contain a usually smaller portion of monocarboxylic acid. As used herein, the term "dimer acid" includes those containing such amounts of these materials. Most useful in the present compositions are products that contain mostly dibasic acid and none or low amounts of tribasic and monobasic acids.

Aliphatic dicarboxylic acids are seen to provide additional advantages. In particular, while not wishing to be bound by theory, it is presently understood that epoxy ester resins derived therefrom wet the substrate surface better and, thus, provide enhanced adhesion between the substrate and the cured coating. They also flow better and provide an excellent, smooth surface upon being cured. Also, the aliphatic units provide enhanced flexibility to the cured coating, as noted above, and this flexibility of the coating is seen to provide enhanced impact resistance. In this regard, it is presently understood that in the epoxy ester resins according to preferred embodiments, employing aliphatic dicarboxylic acid and aliphatic fatty acid, the molecular weight distribution is exceptionally wide due to the approximately identical reaction rates of these reactants with the diepoxide. Such exceptionally wide molecular weight distribution further enhances the flexibility of the cured coating.

Where corrosion protection for the substrate is important, it may be preferred to employ dicarboxylic acid according to formula (I) above, wherein R''' is, at least in part, aromatic. As noted above, it is believed that aromatics in a coating composition of the invention, such as a primer composition for a metal substrate, are more resistant to hydrolysis than are aliphatics and, therefore, provide enhanced corrosion and moisture resistance. Of course, the diphenol and, according to preferred embodiments described above, the diepoxide reactant each provides aromatic units to the resin and each would similarly contribute to corrosion and moisture resistance.

Other suitable dicarboxylic acids for the epoxy ester resin of the present invention will be apparent to the skilled of the art in view of the present disclosure.

The fatty acid employed as a chain terminating esterification reactant for the epoxy ester resin of the present invention includes numerous commercially available materials. Suitable fatty acids include those derived from or contained in either animal or vegetable fat or oil. Preferred are fatty acids of from about 8 to about 18 carbons. Also preferred among the fatty acids are the more saturated fatty acids, since it appears that olefinic unsaturation in the fatty acid can undergo a polymerization-type reaction between such double bonds during the synthesis of the epoxy ester resin of the invention. Unsaturated fatty acids are suitable for use, however, such as, for example, oleic acid, linoleic, linolenic or the like and mixtures of those acids, and can be used together with a suitable inhibitor for the polymerization-type reaction such as hydroquinone or the like, of which many are commercially available and will be apparent to the skilled of the art in view of the present disclosure. In addition, aromatic fatty acids are commercially available and can be employed. The aliphatic fatty acids are preferred, however, in view of the enhanced coating flexibility they provide. Especially preferred for use are the substantially saturated fatty acids such as Soya fatty acid which is most preferred, and butyric, lauric, palmitic and stearic fatty acids and the like or a mixture of any of them. These are relatively inexpensive and have been found to provide good reactivity with the preferred diepoxides described above. For convenience of use, the fatty acids which are semisolid or liquid at room temperature are generally preferred over the solid fatty acids.

The epoxy ester resin of the invention can be made according to reaction conditions now specified employing techniques which are well known and which will be readily apparent to the skilled of the art in view of the present disclosure. The chain extension and chain termination reactions occur substantially simultaneously by charging the diepoxide, the diphenol, the dicarboxylic acid and the fatty acid in a suitable reactor and heating the mixture. It should be recognized that to assure rapid and/or more complete reaction of the diepoxide with the carboxyl and phenol functionalities, and to assure that these reactions occur substantially simultaneously, that is, that they proceed substantially concurrently at approximately the same or similar rates, it is usually preferred to have a catalyst present. Alternatively, other techniques, for example, higher reaction temperatures and/or longer reaction times, or relatively greater proportion of diphenol (since, absent catalyst, phenol functionality is believed to be somewhat less reactive with diepoxide than is carboxyl functionality) can be used to provide substantially simultaneous reactions. The use of catalyst, however, has been found to provide advantageous epoxy ester resin of the invention and is preferred. Epon 829 (trademark), mentioned above, as sold, provides a proprietary catalyst. Epon 828 (trademark), is substantially the same but does not provide such catalyst. Suitable catalysts are commercially available and include, any of the well known catalysts for epoxy-carboxylic/epoxy-phenol reactions such as, for example, sodium carbonate which is preferred, and lithium neodecanoate, lithium naphthenate, lithium nanoate, other known organometallic catalysts and tertiary amine catalysts and the like or a compatible mixture of any of them. Others will be apparent to the skilled of the art in view of the present disclosure.

The reaction mixture is generally heated to at least about 137° C. (280° F.), preferably at least about 176° C. (350° F.). In some instances, in the presence of catalyst, exothermic reaction will proceed with or without further heating, and the reaction mixture will then reach about 193° C.-232° C. (380° F.-450° F.), depending upon the batch size and reactor vessel insulation, ect. In the absence of catalyst, such exotherm is typically not observed and continued heating is required to maintain the reaction temperature, preferably at about 176° C.-193° C. (350° F.-379° F.). The progress of the reaction can be followed by measuring acid number. After the acid number measurements have indicated the reaction is sufficiently completed, preferably at acid number 7 or less, the resin may be diluted with suitable solvent in order to reduce the viscosity to a desirable level for use or storage, for example about 80% solids.

Since, in the preferred embodiments described above, the chain extension reaction of the epoxide functionality with the phenol functionality and the carboxyl functionality of the dicarboxylic acid proceeds at approximately the same rate as the chain termination reaction of the epoxide functionality with the carboxylic functionality of the fatty acid, and since these reactions are carried out simultaneously to yield the epoxy ester resin of the invention, it should be recognized that the relative proportions of the reactants in the reaction mixture can significantly effect the properties of the product resin. Accordingly, it has been found that the reactants are preferably present in amounts which provide the reactive functionality in the relative proportions of one equivalent of epoxy functionality to about 0.2 to about 0.6 equivalent of phenol functionality, to about 0.1 to about 0.4 equivalent of dicarboxylic acid carboxyl functionality, to about 0.4 to about 0.9 equivalent of fatty acid carboxyl functionality. More preferred relative proportions are one equivalent of epoxy functionality to about 0.4-0.6 equivalent of phenol functionality; about 0.1-0.3 equivalent of dicarboxylic acid carboxyl functionality; and about 0.6-0.8 equivalent of fatty acid carboxylic functionality. Epoxy ester resins provided according to such preferred ranges of reactant amounts have been found to provide coating compositions of the invention having exceptional physical properties, most especially corrosion protection such as, for example, when (spray) applied to a metal substrate such as, for example, bare, unpolished automotive vehicle body sheet steel. Most preferably diepoxide, dicarboxylic acid, diphenol and fatty acid are employed in relative amounts of approximately 1:0.5:0.25:0.8 equivalents of functionality, respectively. One most preferred embodiment of the novel epoxy ester resin of the invention comprises the reaction product of diglycidyl ether bisphenol-A resin with bisphenol A, the dimerization reaction product of C-18 fatty acid and Soya fatty acid, wherein the components are employed in relative proportions of about 1:0.2-0.4:0.3-0.5:0.9-1.2 by weight, respectively.

In this regard, while not wishing to be bound by theory, the exceptional corrosion inhibition and other physical properties provided by the coating compositions of the invention are presently believed to stem in large part from a novel chemistry not previously known or suggested. More specifically, it appears that the epoxy ester resins of the invention may comprise, in substantial part, phenol terminated constituents. That is, whereas previously known epoxy adducts suggested for use in coating compositions are reported to be terminated by esterified epoxy groups, it now appears that the epoxy ester resins of the present invention are, in substantial part, phenol terminated. This phenomenon is presently understood to be a consequence of the reaction of both the phenol functional reactant and the carboxylic functional reactants simultaneously with the diepoxide in the relative proportions of reactants specified above. The carboxyl functionality competes with the phenol functionality for reaction with the epoxy functionality. Consequently, (notwithstanding the excess of epoxy relative to phenol in the preferred embodiments described above) reaction products bearing terminal phenol are present upon exhaustion of unreacted epoxy functionality. It would have been expected that the carboxyl functionality would react in major part with the pendent hydroxy groups of the chain-extended intermediate reaction products. However, such reaction would, of course, produce a water molecule, and upon distillation of the epoxy ester resin reaction product, little more water is found than would be contributed as impurity in the reactants. Accordingly, while a portion of the dicarboxylic acid and fatty acid may react with such pendent hydroxy groups, it seems clear that a far larger portion than would be expected reacts with epoxy (in competition with the phenol functionality) such that the epoxy ester resin of the invention is, in substantial part, phenol terminated. One most significant advantage of this novel chemistry is believed to be the excellent cure response of the coating compositions of the invention. The terminal phenol moiety is believed to provide exceptionally high reactivity with polyfunctional aminoplast crosslinking agent at elevated (cure) temperatures.

According to the coating composition aspect of the invention, the above described epoxy ester resin is employed together with polyfunctional aminoplast crosslinking agent. Included within the crosslinking agents suitable for use in the coating composition are numerous materials which are well known to the skilled of the art including, for example, alkylated melamine formaldehyde resins with one to about eight carbon atoms in the alkyl group. Other suitable crosslinking agents will be apparent to the skilled of the art in view of the present disclosure. Many such crosslinking agents are readily commercially available including, for example, the Resimene (trademark) series, Monsanto Company, St. Louis, Mo., the most preferred being Resimene 717 (trademark), described as a low temperature cure methylated melamine-formaldehyde resin.

In addition, suitable polyfunctional aminoplast crosslinking agents can be prepared employing conventional techniques. Accordingly, for example, a lower alkanol such as methanol, ethanol, butanol, isobutanol, isopropanol, hexanol, 2-ethylhexanol or the like or a mixture of any of them is reacted with a melamine formaldehyde. Preferred crosslinking agents of this type include butylated melamine formaldehyde resin, methylated/butylated formaldehyde resin and polyalkyl ethers of polymethylol melamines and the like, of which hexamethoxymethyl melamine resin is most preferred in view of its relatively lower cost, ready commercial availability, its low reactivity with the epoxy ester resin of the invention at normal storage temperatures and its high reactivity at elevated cure temperatures. In this regard, preferred polyfunctional aminoplast crosslinking agent is substantially unreactive with the epoxy ester resin at or below about 60° C. Other suitable melamine crosslinking agents will be apparent to the skilled in the art in view of the present disclosure.

The proper proportion of polyfunctional aminoplast crosslinking agent to epoxy ester resin will depend, in part, upon the properties desired in the coating to be produced and, in part, upon the desired cure response of the coating composition (which will depend, in turn, upon the baking schedule intended for curing the coating composition) and, in part, upon the desired storage stability of the coating composition, that is, upon the desired shelf life. Accordingly, the amounts of epoxy ester resin that can be blended with the crosslinker to form coating compositions of the invention may be varied considerably. Preferably, the crosslinking agent is used in amounts of about 5% to about 40% by weight of the total resin solids, more preferably about 20% to about 30%.

The coating compositions of the invention have been found to provide a cured coating having the advantageous physical properties described above, over a wide range of cure temperatures. More specifically, the coating compositions according to preferred embodiments of the invention have been found to cure at temperatures from as low as about 120° C. or less within about 15 minutes or less, and yet to cure and suffer no significant loss of advantageous physical properties at temperatures as high as about 200° C. or more for periods up to about 60 minutes or more. Considered together with the storage stability of the coating composition, it can be readily recognized that the present invention provides a highly significant advance in the coating composition art.

It will be within the skill of the art to determine the proper volatile organic content for a given coating composition of the invention and for a given application. Preferred solvents have relatively low volatility at temperatures appreciably below their boiling points such that solvent evaporation is low during storage and/or application of the coating composition to the substrate. A suitable solvent system may include, for example, toluene, methyl ethyl ketone, isobutyl acetate, xylene, cellosolve acetate, acetone and a mixture of any of them. Other solvents which may be employed include terpenes, aliphatic and aromatic naphthas, and the like. Additional suitable solvents are commercially available and will be apparent to the skilled of the art in view of the present disclosure. Generally it is preferred to employ a portion of C-4 to C-8 alcohol solvents such as, for example, butanol, pentanol, hexanol, and the like or a mixture of any of them since these inhibit the crosslinking reaction of the polyfunctional aminoplast resin with the epoxy ester resin at room temperature and thereby improve storage stability. At elevated temperature during cure, the alcohol solvent evaporates and, hence, ceases to inhibit the crosslinking reaction. Preferred solvents also may include, for example, methyl amyl ketone and the like, or a mixture thereof with C-4 to C-8 alcohol such as, for example, a 1:2 mixture by weight of butanol and methyl amyl ketone, respectively which is generally most preferred.

Any solvent allowed to remain in the cured coating should be inert so as to avoid adverse effect upon the cured coating or upon another coating layer used in conjunction with it during the curing porcess or thereafter. Preferrably, the cured coating is substantially free of solvent.

Sufficient solvent is used to reduce the viscosity of the coating composition to a level suitable for application to the substrate in the desired manner. While conventional epoxy ester automotive spray-applied primer coating compositions are known to require a volatile organic content of about 540 g/l, comparable coating compositions comprising instead the novel epoxy ester resins of the present invention require as little as 430 g/l or less VOC to provide a viscosity of about 18 sec., #4 Ford Cup at 27° C. (80° F.), which is suitable for spray application techniques. It is generally preferred that sufficient solvent be used to provide a viscosity of about 18 to about 22 seconds, #4 Ford Cup at 27° C. (80° F.) for a coating composition which is to be sprayed onto a substrate. Of course, the coating compositions of the invention need not be formulated as a "high solids" composition. Rather, it can have a higher VOC to provide a lower viscosity. Similarly, the coating compositions of the invention need not be formulated as a sprayable composition. Rather, it can have an even higher solids content and viscosity.

Also preferably included in the coating composition of the invention is any of a variety of acid catalysts known to the skilled of the art to catalyse the aminoplast crosslinking reaction, for example, p-toluenesulfonic acid, phosphoric acid, phenyl acid phosphate, butyl phosphate, butyl maleate, and the like or a compatible mixture of any of them. However, an acid catalyst is most useful only for coating compositions intended for low temperature curing schedules and/or when highly etherified melamine resins are used such as hexa(methoxymethyl)melamine or the like. Such catalysts are used in amounts which depend, in part, upon the intended backing (curing) schedule. Typically amounts of about 0.2% to about 3.% are used, more preferably about 0.4% to about 0.6% by weight of total resin solids. In addition to catalyst, flow control agent(s), for example, polybutyl acrylate; wetting agent(s), for example, silicone; pigments; pigment dispersants; corrosion inhibitors, for example, chromate pigments, numerous of all of which are known to the skilled of the art, may be employed in the coating compositions of the invention. In addition, suitable reactive additives can be used, including, for example, low molecular weight diol flow control agents and reactive diluents.

According to another aspect of the invention, a coating on a substrate is provided, which coating comprises the crosslinked polymer product following cure of a coating composition of the invention. The coating composition can be a low solids composition, that is, it can have a high VOC, but generally a high solids composition, that is, one having a low VOC is preferred for the reasons given above. It can be applied by any conventional method, including brushing, dipping, flow coating, spraying, etc. Spraying will generally be preferred, for example, for applying the compositions as an automotive primer. For the reasons discussed above, the novel epoxy ester resins of the invention are especially advantageous for formulating high solids coating compositions. For this purpose, the epoxy ester resin of the invention preferably has a number average molecular weight ($M_n$) of about 1000 to about 3000. In this regard, coating compositions of the invention employing preferred epoxy ester resins described above are suitable to be applied to a substrate by spraying even though formulated at volatile organic content levels as low as about 347–467 g/l (2.9–3.9 lb./gal.), a more preferred range being about 395–467 g/l (3.3–3.9 lb./gal).

Curing the coating composition requires baking for sufficient time at sufficiently elevated temperature to react the crosslinking agent with the epoxy ester resins. The time and temperature required to cure the coating are interrelated and depend upon the particular epoxy ester resin, crosslinking agent, solvent and other materials, if any, and the amount of each comprising the coating composition. Employing a volatile organic content of about 431 g/l (3.6 lb./gal.) and selecting preferred components as described above, the bake time and temperature is typically about 15 to about 30 minutes and about 135°–165° C. (275°–325° F.), respectively. While the temperature required for cure can be reduced somewhat, for example to about 120° C. (250° F.) for 15 to 30 minutes by addition of suitable catalyst, the coating compositions according to preferred embodiments of the invention, as described above, have been found to provide the best coating results when cured at temperature at about 150° C. (300° F.) for 20 minutes with or without catalyst. It is a highly significant advantage of the invention, however, that these same coating compositions can withstand, for example, temperature as high as about 200° C. (390° F.) for periods of time as long as about 60 minutes. Accordingly, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shut-downs are recovered with cured and unharmed coatings.

High solids coating compositions according to the present invention, comprising the novel crosslinkable epoxy ester resins of the invention, especially the preferred resins described above and melamine crosslinking agent, for example, hexamethoxymethyl melamine, have been found to afford cured coatings with corrosion resistance comparable to conventional epoxy ester based, low solids sprayable coating compositions. The significant reduction in volatile organic content presents, therefore, a highly advantageous advance in the art.

A most preferred use of the coating composition of the invention is as a high solids sprayable primer for use on a bare metal substrate such as a household or industrial appliance housing or an automotive vehicle body. Primer compositions typically are pigmented and any pigments commonly included in primer compositions for metal substrates and acrylic dispersion topcoats such as, for example, carbon black, iron oxide, lithopone, magnesium, silicate, silica, barium sulfate, $TiO_2$, chrome yellow, calcium chromate, strontium chromate, zinc potassium chromate any the like may be used. The primer can be pigmented according to known methods including, for example, by grinding pigments in a portion of the curable resin and adding to the primer composition.

The pigment-to-binder ratio of the primer may be as much as 4:1 by weight, respectively, depending, in part, upon the condition of the metal substrate. It is preferred, however, to use a primer having a pigment-to-binder ratio of about 1:1–2:1 by weight, respectively.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent system may be any suitable combination of organic solvents as described above. For a high solids, sprayable, automotive vehicle primer, the solvent will comprise preferably about 25 to about 35 percent by weight of the total coating compositions, although of course, larger or smaller amounts may be utilized depending upon the solids content desired. For example, it may be desirable to formulate the primer with a relatively high solids content and then reduce it to spraying consistency prior to the time of application.

The metal substrate can be, for example, aluminum, steel, or phosphated cold-rolled steel. However, any metal used as a construction material is usable. The primer composition may be coated onto the metal base in any conventional manner such as roll coating, brushing, curtain coating, etc. The preferred method of applying the primer composition to the metal is by spraying. The primer is cured at elevated temperatures by any convenient means such as baking ovens or banks of infra-red heat lamps. Suitable curing temperatures are discussed above.

The primer is generally thinned to from about 65 to about 70 percent solids content for spraying purposes with conventional thinners such as aromatic hydrocarbons, commercial petroleum cuts which are essentially aromatic, and the like, and sprayed onto the metal base and cured. The primer is cured at elevated temperatures by any convenient means such as baking ovens or banks of infra-red heat lamps. Curing temperatures are preferably from about 135° C. to about 165° C., although curing temperatures from about 100° C. to about 230° C. may be employed, if desired.

The invention will be further understood by referring to the following detailed examples. It should be understood that the specific examples are presented by way of illustration and not by way of limitation. Unless otherwise specified, all references to "parts" are intended to mean parts by weight.

EXAMPLE I

This example illustrates the preparation of an epoxy ester resin according to the present invention. In a suitable reactor were charged 1248 parts of Epon 829 (trademark) Shell Chemical Company (diglycidyl ether of bisphenol-A), 342 parts of bishpenol-A, 463 parts of Empol 1014 (trademark) Emery Industries, Inc. (dimer acid) and 1400 parts of Soya fatty acid. The temperature of the mixture was brought up to about 177° C. (350° F.) at which point an exothermic reaction took place that raised the temperature up to about 193° C. (380° F.). After 2 hours at this temperature, the acid number was found to be 5.9. The reaction mixture was then cooled down to about 149° C. (300° F.) and 863 parts of methyl amyl ketone were added. The resulting resin had a viscosity of T½ at 80% solids.

EXAMPLES II–V

Epoxy ester resins according to the invention were prepared in the manner generally of Example I. The components employed are shown in Table I, below. The diepoxide, dicarboxylic acid, fatty acid and diphenol, with catalyst (sodium carbonate), if any, were charged in a suitable reactor. The mixture was heated to about 177° C. (350° F.). At this point, exothermic reaction took place that brought the temperature to about 188°-199° C. (370°-390° F.). The reaction was continued at this temperature until the acid number dropped below 6. Then the product was cooled to about 121° C. (250° F.) and thinned to 80% non-volatiles by weight with methyl amyl ketone. In Table I, all amounts are shown in parts by weight.

TABLE I

|  | Example | | | |
| --- | --- | --- | --- | --- |
|  | II | III | IV | V |
| Epon 829[1] | 1248 | 1248 |  |  |
| DER 333[2] |  |  | 1248 |  |
| Epon 828[3] |  |  |  | 1248 |
| Empol 1016[4] | 463 | 463 | 463 | 463 |
| Bisphenol A | 342 | 342 | 342 | 342 |
| Linseed Fatty Acid | 1400 |  |  |  |
| Pamolyn 200[5] |  | 1400 |  |  |
| Soya Fatty Acid |  |  | 1400 | 1400 |
| Sodium Carbonate |  |  |  | 2.3 |
| Methyl Amyl Ketone | 860 | 860 | 960 | 860 |
| % Non-Volatiles | 80.0 | 79.8 | 79.6 | 79.8 |
| Viscosity | T½ | T½ | V | V½ |
| Acid Number | 5.6 | 4.9 | 5.2 | 5.9 |

[1]Trademark, Shell Chemical Co. (diepoxide; specifically, bisphenol-A epichlorohydrin epoxy resin)
[2]Trademark, Dow Chemical Co. (diepoxide)
[3]Trademark, Shell Chemical Co. (diepoxide)
[4]Trademark, Emery Industries, Inc. (dimer acid)
[5]Trademark, Hercules Incorporated, Wilmington, Delaware (pale, color-stable high purity grade linoleic acid)

EXAMPLE VI

Epoxy ester resin according to the invention is prepared in the manner generally of Example I. The components employed are Epon 829 (trademark), Shell Chemical Company, 1248. g, azelaic acid, 152. g, Bisphenol A, 342. g, and Soya fatty acid 1400. g. The diepoxide, dicarboxylic acid, fatty acid and diphenol are charged to a suitable reactor. The mixture is heated to about 177° C. (350° F.) at which point exothermic reaction brings the temperature to about 188°-199° C. (370°-390° F.). The reaction is continued at this temperature until the acid number drops below 6. The product is then cooled to about 121° C. (250° F.) and thinned to about 78.5% non-volatiles by weight with methyl amyl ketone 785. g. The viscosity is X½ and the acid number is 3.8.

EXAMPLE VII

An epoxy ester resin according to the invention was prepared. In a suitable reactor were charged 884 parts of Araldite RD-2 (trademark) Ciba-Geigy Corporation (diglycidyl ether of 1,4-butane diol), 342 parts of bisphenol-A, 463 parts of Empol 1014 (trademark) Emery Industries, Inc. (dimer acid), 1400 parts of Soya fatty acid and 1.5 parts of sodium carbonate. The temperature of the mixture was brought up to about 177° C. (350° F.) at which point an exothermic reaction took place that raised the temperature up to 193° C. (380° F.). After one hour at this temperature, the acid number was found to be 5.8. The reaction mixture was then cooled down to about 149° C. (300° F.) and 772 parts of methyl amyl ketone were added. The resulting resin had a viscosity of P at 80% solids.

EXAMPLE VIII

A millbase, that is, a composition pigment paste was prepared by grinding in a ballmill the following mixture:

| Composition | Parts |
| --- | --- |
| Barium Sulfate | 1626 |
| Red Iron Oxide | 60 |
| Titanium dioxide | 105 |
| Silica | 75 |
| Strontium chromate | 99 |
| Polyethylene Wax | 48 |
| Xylene | 200 |
| Toluene | 240 |
| 2 ethyl hexanol | 57 |
| Resin of Example I | 264 |

EXAMPLES IX-XII

Coating compositions according to the invention were prepared, each being adapted for use as a high solids, sprayable, pigmented primer for application over bare, unpolished steel automotive vehicle body panels in an automotive vehicle assembly operation. The coating composition components are shown in Table II, below. Each coating composition was reduced with methyl amyl ketone to about 18-25 sec. #4 Ford Cup, 27° C. (80° F.) to provide a preferred spraying viscosity. It will be noted that use of a drier, as in Examples IX, X and XI, is optional, to catalyse reaction of fatty acid double bonds to provide additional crosslinking in the cured resin. In Table II, all amounts are expressed in parts by weight.

TABLE II

|  | Example | | | |
| --- | --- | --- | --- | --- |
|  | IX | X | XI | XII |
| Epoxy Ester Resin of Example I | 270 | 270 | 270 | 270 |
| Phenyl acid phosphate | — | 1 | — | — |
| PTSA | — | — | 1 | 1 |
| Millbase of Example VIII | 800 | 800 | 800 | 800 |
| Resimine 717[1] | 110 | 110 | — | — |
| Cymel 325[2] | — | — | 110 | — |
| Cymel 303[3] | — | — | — | 93 |
| 6% Manganese Naphthanate (Drier) | 4 | 4 | 4 | — |
| Butanol | 35 | 35 | 35 | — |

[1]Trademark, Monsanto Co., St. Louis, MO. (low temperature, high solids methylated melamine-formaldehyde resin crosslinking agent).
[2]Trademark, American Cyanamid, Wayne, New Jersey, (highly methylated melamine formaldehyde resin).
[3]Trademark, American Cyanamid, Wayne, New Jersey, (hexa(methoxymethyl)-melamine).

EXAMPLES XIII-XVIII

Additional coating compositions according to the invention, each adapted for use as a high solids, sprayable pigmented primer for application over, for example, bare, unpolished steel automotive vehicle body panels in an automotive vehicle assembly operation, are prepared as shown in Table III, below. It should be noted that use of a drier, as in the coating compositions illustrated in Table III, is optional. The epoxy ester resin employed in each coating composition is identified by reference to the Example according to which it was prepared. All amounts are expressed in parts by weight.

TABLE III

| | Example | | | | | |
|---|---|---|---|---|---|---|
| | XIII Exp. II | XIV Exp. III | XV Exp. IV | XVI Exp. V | XVII Exp. VI | XVIII Exp. VII |
| Epoxy Ester Resin | 270 | 270 | 270 | 270 | 270 | 270 |
| Phenyl acid phosphate | 1 | 1 | 1 | 1 | 1 | 1 |
| Millbase of Example VII | 800 | 800 | 800 | 800 | 800 | 800 |
| Resimine 717[1] | 110 | 110 | 110 | 110 | 110 | 110 |
| 6% Manganese Naphthanate (Drier) | 4 | 4 | 4 | 4 | 4 | 4 |
| Butanol | 35 | 35 | 35 | 35 | 35 | 35 |

[1]Trademark, Monsanto Co., St. Louis, MO. (low temperature, high solids methylated melamine-formaldehyde resin crosslinking agent).

EXAMPLES XIX-XXI

The coating composition of Examples IX, X, XI and XII were spray applied to bare, unpolished Bonderite steel, cured, and tested for corrosion resistance and humidity resistance. The curing schedule and the results of the testing are shown in Table IV, below. Corrosion is measured as inches of corrosion from scribe line following 240 hours salt spray. Humidity resistance is qualitatively evaluated following exposure to condensing humidity at 43° C. (110° F.).

TABLE IV

| | Example | | | | |
|---|---|---|---|---|---|
| | XIX | XX | XXI | XXII | XXIII |
| Coating Composition | IX | IX | X | XI | XII |
| Curing Schedule | 135° C. 15 min. | 150° C. 15 min. | 135° C. 15 min. | 135° C. 15 min. | 163° C. 30 min. |
| Corrosion Resistance | 2/8" | 2/8" | 2/8" | 2/8" | 2/8" |
| Humidity Resistance | poor | good | excel. | good | excel. |

In view of this disclosure, many modifications of this invention will be apparent to those skilled in the art. It is intended that all such apparent modifications fall within the true scope of this invention and be included within the terms of the appended claims.

INDUSTRIAL APPLICABILITY

It will be apparent from the foregoing that this invention has industrial applicability as a coating composition, especially as a high solids primer coat composition for automotive vehicles, household appliances and the like, and other applications where the coating composition desirably has excellent storage stability and the cured coating desirably provides excellent humidity the solvent resistance to protect a substrate, for example a metal substrate, against corrosion, wear and the like.

What is claimed is:

1. A novel epoxy ester resin adapted for use in a thermosetting coating composition, which epoxy ester resin is of number average molecular weight ($M_n$) about 1000 to about 5000, being the reaction product of diepoxide with (i) diphenol in chain extension reaction, (ii) dicarboxylic acid in chain extension reaction, and (iii) monobasic fatty acid in chain terminating esterification reaction, which chain extension reactions and esterification reaction occur substantially simultaneously at a reaction temperature reaching at least about 137° C., wherein the epoxy functionality, phenol funtionality, dicarboxylic acid carboxyl functionality and fatty acid carboxyl functionality are employed in relative proportions of about 1:0.2–0.6:0.1–0.4:0.4–0.9 equivalents, respectively.

2. The epoxy ester resin of claim 1 wherein said number average molecular weight is about 1000 to about 3000.

3. The epoxy ester resin of claim 1 wherein said diepoxide has a number average molecular weight of about 100–1000.

4. The epoxy ester resin of claim 1 wherein said diepoxide is selected from the group consisting of bisphenol-A epichlorohydrin epoxy resin, hydantoin epoxy resin, cyclic and acyclic aliphatic diepoxide, and the like and a mixture of any of them.

5. The epoxy ester resin of claim 1 wherein said diepoxide bears two terminal epoxide groups.

6. The epoxy ester resin of claim 1 wherein said diepoxide consists essentially of diglycidyl ether bisphenol-A resin.

7. The epoxy ester resin of claim 1 or 3 wherein the diphenol has a number average molecular weight of about 180–500.

8. The epoxy ester resin according to claim 1 wherein said diphenol is of the general formula:

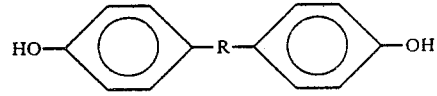

wherein R is a divalent, organic, linking moiety substantially unreactive with the epoxy functionality of the diepoxide resin.

9. The epoxy ester resin according to claim 8 wherein R is selected from the group consisting of an alkylene or alkylidene moiety of one to about 10 carbons and the like and a mixture thereof.

10. The epoxy ester resin according to claim 8 wherein R is

wherein R' and R" are the same or different and each is selected from the group consisting of hydrogen and alkyl of 1 to about 4 carbons, and the like and a mixture of any of them.

11. The epoxy ester resin according to claim 1 wherein said diphenol is selected from the group consisting of bisphenol-A, bisphenol-B and the like and a compatible mixture of any of them.

12. The epoxy ester resin according to claim 1 or 6 wherein said diphenol consists of bisphenol-A.

13. The epoxy ester resin of claim 1 or 3 wherein said dicarboxylic acid has a number average molecular weight of about 145-1000.

14. The epoxy ester resin according to claim 1 wherein said dicarboxylic acid is saturated or unsaturated, cyclic or acyclic aliphatic or aromatic dicarboxylic acid.

15. The epoxy ester resin according to claim 1 wherein said dicarboxylic acid is of the general formula:

HOOC—R'''—COOH wherein R''' is a divalent linking moiety substantially unreactive with the epoxy functionality of the diepoxide resin.

16. The epoxy ester resin according to claim 15 wherein R''' is selected from the group consisting essentially of an alkylene or alkylidene moiety of about 4 to about 42 carbons and the like and a mixture thereof.

17. The epoxy ester resin according to claim 1 wherein said dicarboxylic acid provides two terminal carboxylic groups.

18. The epoxy ester resin according to claim 1 wherein said dicarboxylic acid consists essentially of acyclic, aliphatic dimer acid of about 4-42 carbons.

19. The epoxy ester resin of claim 1, 6 or 11 wherein said dicarboxylic acid consists essentially of the dimer acid reaction product of C-18 fatty acid.

20. The epoxy ester resin according to claim 1 wherein said monobasic fatty acid is selected from the group consisting of monobasic fatty acids of from about 8 to about 18 carbons and a mixture of any of them.

21. The epoxy ester resin according to claim 1 wherein said monobasic fatty acid consists essentially of substantially saturated monobasic aliphatic fatty acid.

22. The epoxy ester resin according to claim 19 wherein said monobasic fatty acid consists essentially of Soya fatty acid.

23. The epoxy ester resin according to claim 1 being the reaction product of said chain extension reactions and said chain termination reaction in the presence of catalyst for same.

24. The epoxy ester resin according to claim 23 wherein said catalyst is selected from the group consisting of organometallic catalyst, tertiary amine catalyst and the like and a compatible mixture of any of them.

25. The epoxy ester resin according to claim 23 wherein said catalyst is selected from the group consisting of sodium carbonate, dimethyl benzyl amine, lithium neodecanoate, lithium naphthenate lithium nanoate and the like and a compatible mixture of any of them.

26. The epoxy ester resin of claim 1, 6, 11, 18 or 21 wherein said diepoxide, said diphenol, said dicarboxylic acid and said monobasic fatty acid are employed in relative amounts of about 1:0.4-0.6:0.1-0.3:0.6-0.8 equivalents, respectively.

27. The epoxy ester resin of claim 26 wherein said diepoxide, said diphenol, said dicarboxylic acid and said monobasic fatty acid are employed in relative amounts of about 1:0.5:0.25:0.8 equivalents, respectively.

28. The novel epoxy ester resin of claim 1 or 16 wherein said diepoxide consists essentially of diglycidyl ether bisphenol-A resin, said diphenol consists essentially of bisphenol-A, said dicarboxylic acid consists essentially of the dimer acid reaction product of C-18 fatty acid, and said monobasic fatty acid consists essentially of Soya fatty acid, and wherein said diepoxide, diphenol, dicarboxylic acid and monobasic fatty acid are employed in relative proportions of about 1:0.2-0.4:0.3-0.5:0.9-1.2 by weight, respectively.

29. An 80% solids by weight solution of the epoxy ester resin of claim 28 in methyl amyl ketone.

30. A novel, organic solvent based, thermosetting coating composition comprising:

A. epoxy ester resin of number average molecular weight ($M_n$) about 1000 to about 5000, being the reaction product of diepoxide with (i) diphenol in chain extension reaction, (ii) dicarboxylic acid in chain extension reaction, and (iii) monobasic fatty acid in chain terminating esterification reaction, which chain extension and esterification reactions occur substantially simultanesouly at a reaction temperature reaching at least about 137° C., wherein the epoxy functionality, phenol functionality, dicarboxylic acid carboxyl functionality and monobasic fatty acid carboxyl functionality are employed in relative proportions of about 1:0.2-0.6:0.1-0.4:0.4-0.9 equivalents, respectively; and B. polyfunctional aminoplast crosslinking agent.

31. The solvent based, thermosetting coating composition of claim 30, wherein said number average molecular weight is about 1000 to about 3000.

32. The solvent based, thermosetting coating composition of claim 30, wherein said diepoxide has a number average molecular weight of about 100-1000.

33. The solvent based, thermosetting coating composition of claim 30 wherein said diepoxide resin is selected from the group consisting of bisphenol-A epichlorohydrin epoxy resin, hydantoin epoxy resin, cyclic and acyclic aliphatic diepoxide, and the like and a mixture of any of them.

34. The solvent based, thermosetting coating composition of claim 30 wherein said diepoxide bears two terminal epoxide groups.

35. The solvent based, thermosetting coating composition of claim 30 wherein said diepoxide consists essentially of diglycidyl ether bisphenol-A resin.

36. The solvent based, thermosetting coating composition of claim 30 wherein said diphenol has a number average molecular weight of about 180-500.

37. The solvent based, thermosetting coating composition of claim 30 wherein said diphenol is of the general formula:

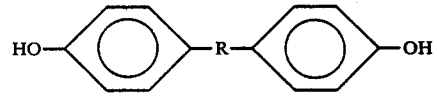

wherein R is a divalent, organic linking moiety substantially unreactive with the epoxy functionality of the diepoxide resin.

38. The solvent based, thermosetting coating composition of claim 37 wherein R is selected from the group consisting of an alkylene or alkylidene moiety of one to about 10 carbons and the like and a mixture thereof.

39. The solvent based, thermosetting coating composition of claim 37 wherein R is

wherein R' and R" are the same or different and each is selected from the group consisting of hydrogen and alkyl of 1 to about 4 carbons, and the like and a mixture of any of them.

40. The solvent based, thermosetting coating composition of claim 30 wherein said diphenol is selected from the group consisting of bisphenol-A, bisphenol-B and the like and a compatible mixture of any of them.

41. The solvent based, thermosetting coating composition of claim 30 or 35 wherein said diphenol consists essentially of bisphenol-A.

42. The solvent based, thermosetting coating composition of claim 30 wherein said dicarboxylic acid has a number average molecular weight of about 145–1000.

43. The solvent based, thermosetting coating composition of claim 30 wherein said dicarboxylic acid is saturated or unsaturated, cyclic or acyclic aliphatic or aromatic dicarboxylic acid.

44. The solvent based, thermosetting coating composition of claim 30 wherein said dicarboxylic acid is of the general formula:

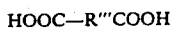

wherein R''' is a divalent, linking moiety substantially unreactive with the epoxy functionality of the diepoxide resin.

45. The solvent based, thermosetting coating composition of claim 44 wherein R''' is selected from the group consisting of an alkylene or alkylidene moiety of about 4 to about 42 carbons and the like and a mixture thereof.

46. The solvent based, thermosetting coating composition of claim 30 wherein said dicarboxylic acid provides two terminal carboxyl groups.

47. The solvent based, thermosetting coating composition of claim 30 wherein said dicarboxylic acid consists essentially of acrylic, aliphatic dimer acid of about 4–42 carbons.

48. The solvent based, thermosetting coating composition of claim 30, 35 or 40 wherein said dicarboxylic acid consists essentially of the dimerization reaction product of C-18 fatty acid.

49. The solvent based, thermosetting coating composition of claim 30 wherein said monobasic fatty acid is selected from the group consisting of monobasic fatty acids of about 8 to about 18 carbons and a mixture of any of them.

50. The solvent based, thermosetting coating composition of claim 30 wherein said monobasic fatty acid consists essentially of substantially saturated monobasic aliphatic fatty acid.

51. The solvent based, thermosetting coating composition of claim 48 wherein said monobasic fatty acid consists essentially of Soya fatty acid.

52. The solvent based, thermosetting coating composition of claim 51 wherein said polyfunctional aminoplast crosslinking agent consists essentially of hexa(methoxymethyl)melamine and the like and a compatible mixture thereof.

53. The solvent based, thermosetting coating composition of claim 30 wherein said diepoxide, said diphenol, said dicarboxylic acid and said monobasic fatty acid are employed in relative amounts of about 1:0.4–0.6:0-.1–0.3:0.6–0.8 equivalents, respectively.

54. A sprayable, pigmented, high solids primer adapted for use on bare metal substrate, comprising the caoting composition of claim 30, 35, 40, 47 or 50 wherein the volatile organic content is less than about 400 g/l and the viscosity no greater than about 35 sec., #4 Ford Cup at 27° C.

55. The sprayable, pigmented, high solids primer of claim 54 wherein the pigment to resin ratio is about 1:1 to about 2:1, respectively.

56. A novel, organic solvent based, thermosetting coating composition comprising:

A. epoxy ester resin of number average molecular weight ($M_n$) about 1000 to about 3000, being the reaction product of diepoxide consisting essentially of diglycidyl ether bisphenol-A resin with (i) diphenol consisting essentially of bisphenol-A, in chain extension reaction, (ii) dicarboxylic acid consisting essentially of the dimerization reaction product of C-18 fatty acid, in chain extension reaction, (iii) monobasic fatty acid consisting essentially of Soya fatty acid, in chain termination esterification reaction, and (iv) catalyst for said chain extension and esterification reactions, which reactions occur substantially simultaneously at a reaction temperature reaching at least about 176° C., wherein the epoxy functionality, phenol functionality, dicarboxylic acid carboxyl functionality and monobasic fatty acid carboxyl functionality are employed in relative proportions of about 1:0.4–0.6:0.1–0.3:0.6–0.8 equivalents, respectively; and B. polyfunctional aminoplast crosslinking agent.

57. A sprayable, pigmented, high solids primer adapated for use on bare metal substrate, comprising the coating composition of claim 56 wherein the volatile organic content is less than about 400 g/l and the viscosity no greater than about 35 sec., #4 Ford Cup at 27° C.

* * * * *